Dec. 16, 1958 E. L. BYRNE 2,864,954

PULSE REGENERATOR CIRCUIT

Filed Nov. 1, 1957 2 Sheets-Sheet 1

INVENTOR.
EDWARD L. BYRNE
BY G. D. O'Brien
Q. Baxter Warner
ATTORNEYS

Dec. 16, 1958 E. L. BYRNE 2,864,954

PULSE REGENERATOR CIRCUIT

Filed Nov. 1, 1957 2 Sheets-Sheet 2

INVENTOR.
EDWARD L. BYRNE
BY G. D. O'Brien
O. Baxter Warner
ATTORNEYS 2,864,954

Patented Dec. 16, 1958

2,864,954

PULSE REGENERATOR CIRCUIT

Edward L. Byrne, Merchantville, N. J., assignor, by mesne assignments, to the United States of America as represented by the Secretary of the Navy Application November 1, 1957, Serial No. 694,059

1 Claim. (Cl. 250—27)

This invention relates generally to improved apparatus for electrical wave shaping and particularly to improved apparatus for the conversion of sine wave digital information into narrow pulses of high signal-to-noise ratio.

In data handling circuitry a method of converting an input comprising sine wave digital information into narrow amplified pulses of high signal-to-noise ratio is needed for satisfactory operation of subsequent circuitry.

An object of the invention is to provide improved apparatus for the conversion of such digital information into narrow amplified pulses for the operation of subsequent circuitry.

Another object is to provide simpler and more reliable pulse regenerator apparatus for such signal conversion.

Another object is to provide improved digital information in the form of narrow output pulses of high signal-to-noise ratio.

The foregoing objects are accomplished in accordance with the invention by an improved circuit wherein the sine wave digital information is clipped and the clipped portion is used to condition a gate such as a coincidence circuit for a narrow timing pulse which is derived from a sine wave timing input. The gated output of the coincidence circuit, which exists only when the narrow timing pulse and clipped portion of the sine wave information occur simultaneously, is used to trigger a blocking oscillator which provides the narrow output pulses of high signal-to-noise ratio.

The invention will be described in greater detail by reference to the accompanying drawings, showing by way of example, a preferred embodiment of the invention, and wherein.

Similar reference characters are used for similar elements throughout the drawings.

Figure 1:
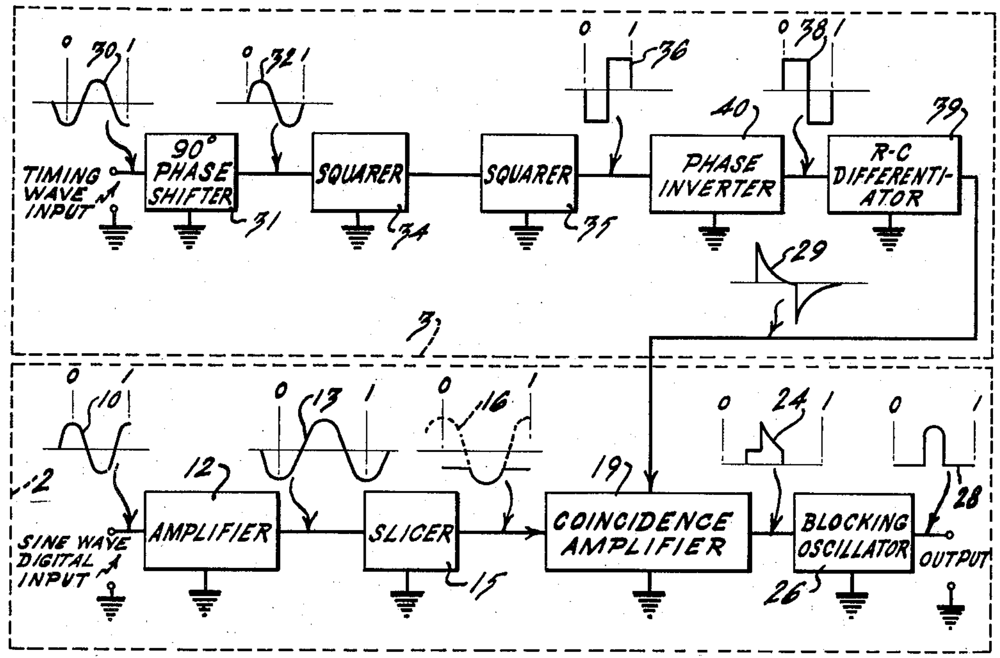
Figure 1 is a block circuit diagram of said preferred embodiment.
Figure 3:
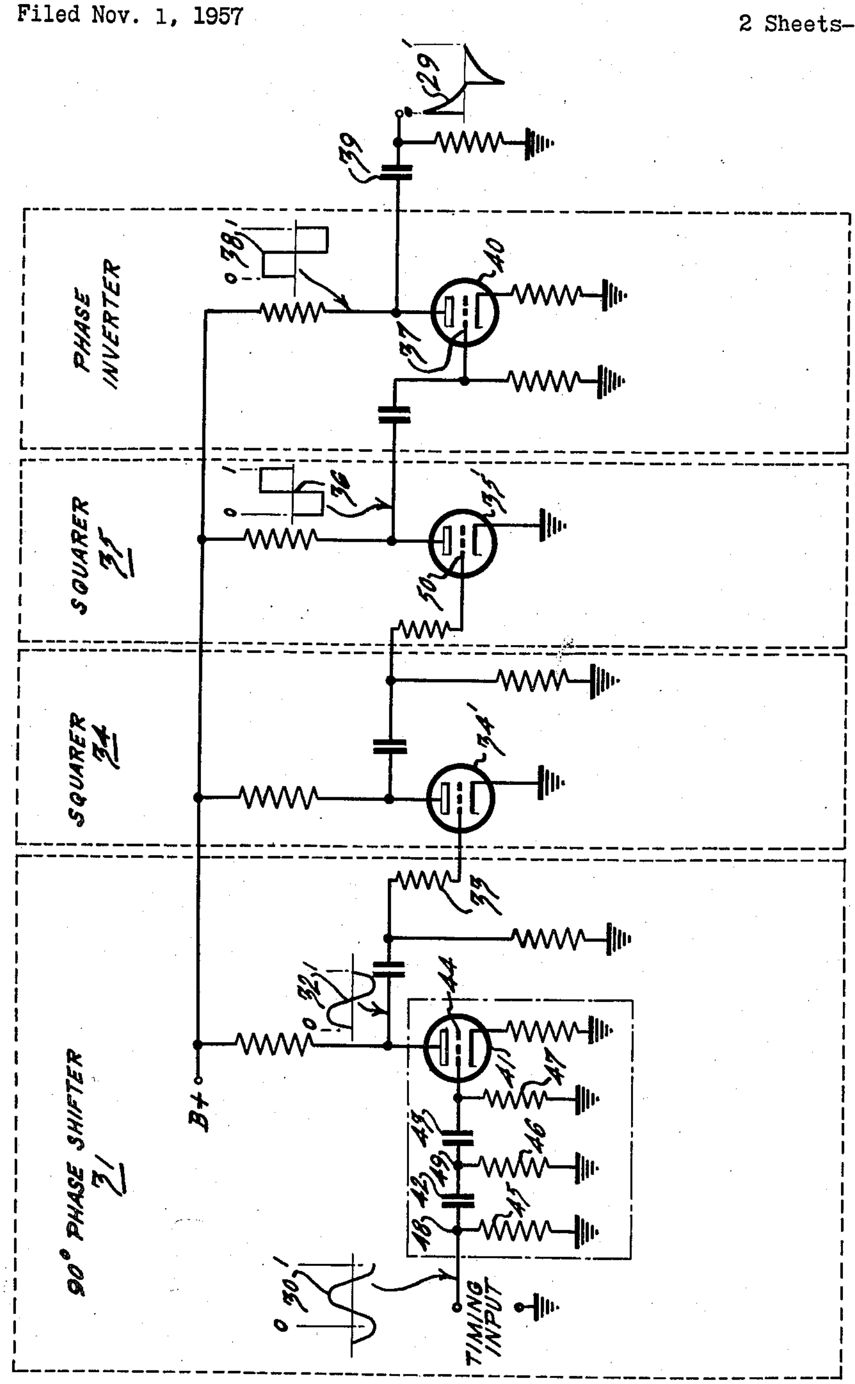
Figure 3 is a schematic circuit diagram of the timing wave shaping portion of said embodiment.

Figure 1 is a block circuit diagram of the preferred embodiment of the invention. The upper part of Figure 1 is a block diagram of the circuit of Figure 3 showing the timing wave shaping circuit which consists of a 90° phase shifting circuit 31, squarer circuits 34 and 35, phase inverter 40, and an RC differentiator 39. The function of said timing wave shaping circuit is to convert the sine wave timing input into narrow timing pulses. This is accomplished by squaring the sine wave input, after it has been shifted 90° in the phase shifter, and then differentiating the square wave.

Figure 2:
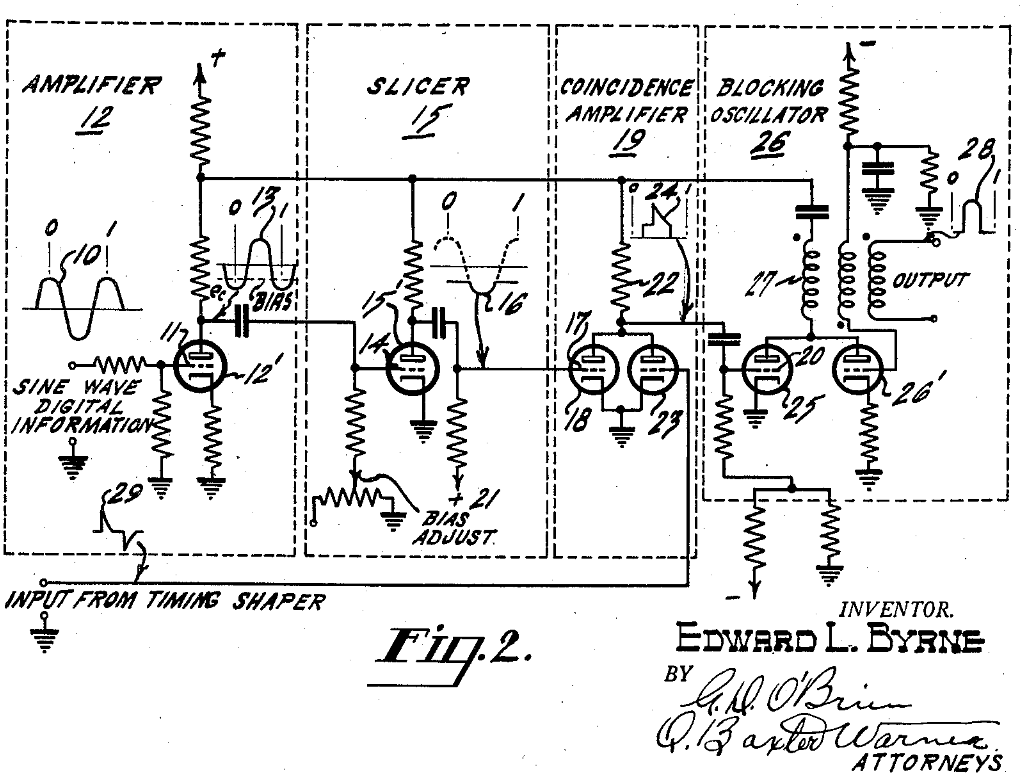
Figure 2 is a schematic circuit diagram of the digital information wave shaping portion of said embodiment.

The lower part of Figure 1 is a block diagram of the circuit of Figure 2 showing the digital information wave shaping circuit, which consists of an amplifier 12, slicer circuit 15, coincidence amplifier 19 and blocking oscillator 26. The function of said digital information wave shaping circuit is to provide narrow amplified output pulses which have been properly gated. This is accomplished by selecting a predetermined portion of the sine wave digital information in a slicer circuit 15, using said portion 16 to condition a gate for the narrow timing pulses in the coincidence amplifier 19, and triggering the blocking oscillator with the gated timing pulses 24 to produce narrow amplified output pulses 28.

Referring to Figure 2, sine wave digital information 10, for example, is applied to the grid 11 of a triode amplifier 12'. The amplified signal 13 is then applied to the grid 14 of limiter tube in the "slicer" circuit 15, said tube being normally cut off by the negative bias $e_c$ applied to the grid 14. When the input voltage 13 is sufficiently positive to bring the tube into operation, a "sliced" output wave 16 appears. The output 16, due to phase reversal, is a clipped portion of the negative wave. This clipped output wave 16 is applied to the grid 17 of the first tube 18 of a coincidence amplifier 19. To the grid 20 of the second tube 23 are applied narrow timing pulses 29 obtained from a timing pulse shaper in a manner to be described below.

The high value of the plate resistor 22 in the plate circuit of the coincidence amplifier 19 causes the plate voltage to be very low. The positive voltage 21 which is applied to the grid 17 of tube 18 of the coincidence amplifier 19 assures that the plate voltage will be very, very low. The grid-to-cathode potential of the second tube 23 of the coincidence amplifier 19 is approximately 0, and due to the very low anode voltage, the second tube 23 does not appreciably conduct. When a clipped portion of the negative wave 16 appears at the grid 17 of tube 18 the plate of the coincidence amplifier 19 is driven positive causing the second tube to conduct.

The resulting gated output 24 of the coincidence amplifier 19 is then applied to the grid of a blocking oscillator tube 26' through a coupling transformer 27 in the anode circuit of the buffer amplifier tube 25. The output of the blocking oscillator 26 consists of the desired narrow output pulses 28. The narrow timing pulses 29 are obtained by means of a timing wave shaping circuit.

Referring to Figure 3 a sine wave timing input 30 is applied to a 90° phase shifter circuit 31. The phase shifting circuit 31 consists of an electron tube 41 with the timing input 30 connected to its grid 44 by means of a grid circuit composed of two capacitors 42, 43 connected in series from the source of timing input to the grid 44 and three resistors 45, 46, 47. Resistor 45 is connected from the junction 48 of the timing input and first capacitor to ground. Resistor 46 is connected from the junction 49 of the two capacitors 42, 43 to ground. Resistor 47 is connected from grid 44 to ground. This grid circuit and the phase reversal in the tube provide a 90° phase shift in the timing input.

The output 32 of the phase shifter circuit 31 is then applied through a series resistor 33 to the grid of a squaring amplifier 34'. The combination of grid circuit clipping (to flatten the top of the grid voltage wave and the bottom of the plate voltage wave) and plate current cut off clipping (to flatten the top of the plate voltage wave) results in converging a sinusoidal input wave into a nearly square wave. This nearly square wave is then applied to the grid 50 of a second squaring amplifier 35' which is identical to the first 34. The output wave 36 of the second squaring amplifier 35 is an almost perfect square wave.

This square wave 36 is then applied to the grid 37 of a phase inverter tube 40, the output 38 of which is applied to a differentiator circuit 39, the differentiated output of which (appearing across the resistor) consists of the narrow timing pulses which are applied to the grid 20 of the second stage of the coincidence amplifier 19.

Obviously many modifications and variations of the present invention are possible in the light of the above teachings. It is therefore to be understood that within the scope of the appended claim the invention may be practiced otherwise than is specifically described.

What is claimed is:

A pulse regenerator comprising, in combination, first connection means for a source of sine wave digital information; an amplifier circuit including a first electron tube having at least a cathode, an anode, and a control element, means for applying said digital information to the control element of said first tube, means for deriving an output signal from the anode of said first tube; a slicer circuit including a second electron tube with at least a cathode, an anode, and a negatively biased control element, means for applying the output of the first tube to said grid of the second tube for deriving a clipped output from said anode of said second tube; connection means for a source of sine wave timing signals whose frequency is the same as that of the sine wave digital information; a phase shifter including a third electron tube having at least a cathode, an anode, and a control element, means including a phase shifting network for applying said timing input to said control grid of said third tube, means for deriving an output signal from the anode of said third tube; a squarer circuit including a fourth electron tube having at least a cathode, an anode, and a control element, means including a series resistor for applying the output of the third tube to the control element of the fourth tube, means for deriving an output signal from said fourth tube, a second squarer circuit similar to the first including a fifth electron tube, means including a series resistor for applying the output from the first squarer circuit to the control element of said fifth electron tube, a phase inverter including a sixth electron tube having at least a cathode, an anode and a control element, means for deriving the output from the anode of the fifth tube and applying it to the grid of the sixth electron tube, a series resistor and capacitor differentiator circuit coupled to said anode of said sixth tube, means for deriving narrow timing pulses from said resistor of said differentiator circuit; a coincidence amplifier responsive to the simultaneous occurrence of said narrow timing pulses and said clipped pulses of sine wave information to provide control pulses, said coincidence amplifier including a seventh and eighth electron tubes having their cathodes connected together and their anodes connected together, means for applying said clipped output of said second tube to the control element of said seventh tube, means for applying said narrow timing pulses to said grid of said eighth tube, means for deriving said control pulses from said coincidence amplifier, a blocking oscillator including a ninth electron tube with at least a cathode, an anode, and a control element, means for applying said control pulses to the grid of said ninth tube, means for deriving the output of the ninth tube said output being the desired narrow amplified pulse output.

References Cited in the file of this patent

UNITED STATES PATENTS

| | | |
|---|---|---|
| 2,426,225 | Krause | Aug. 26, 1947 |
| 2,519,057 | Luck | Aug. 15, 1950 |
| 2,711,532 | Slusser | June 21, 1955 |